United States Patent [19]

Hinson

[11] Patent Number: 5,022,809
[45] Date of Patent: Jun. 11, 1991

[54] TRUCK FOR ALTERNATELY HANDLING BULK AND PALLETIZED CARGO

[75] Inventor: Teddy P. Hinson, Mechanicsville, Va.

[73] Assignee: Solite Corporation, Richmond, Va.

[21] Appl. No.: 476,168

[22] Filed: Feb. 7, 1990

[51] Int. Cl.⁵ .............................................. B65G 67/02
[52] U.S. Cl. .................................. 414/494; 414/500; 414/506; 414/559; 414/786
[58] Field of Search ............... 414/494, 500, 506, 538, 414/559, 786, 498; 298/1 B, 17 R; 296/37.1, 37.6, 37.14; 410/128

[56] References Cited

U.S. PATENT DOCUMENTS

| | | | |
|---|---|---|---|
| 1,451,127 | 4/1923 | Thornton | 414/494 X |
| 1,537,457 | 5/1925 | Bryan | 414/494 |
| 1,557,749 | 10/1925 | Weber | 296/184 |
| 1,684,095 | 9/1928 | Heaton | 298/17 R |
| 2,216,972 | 10/1940 | Gibson et al. | 414/494 |
| 2,514,752 | 7/1950 | Faulkner et al. | 414/500 X |
| 2,789,715 | 4/1957 | Filipoff et al. | 414/500 X |
| 2,819,810 | 1/1958 | DeWitt | 414/499 |
| 2,974,931 | 3/1961 | Reel et al. | 410/128 |
| 3,037,807 | 6/1962 | Hicks | 296/10 |
| 3,087,759 | 4/1963 | Worster | 298/24 |
| 3,263,845 | 8/1966 | Davidson | 414/559 |
| 3,369,684 | 2/1968 | Ford | 414/498 |
| 3,659,899 | 5/1972 | Phillips et al. | 298/22 R |
| 3,712,491 | 1/1973 | Kreutzer | 414/494 |
| 3,756,469 | 9/1973 | Clark et al. | 298/24 X |
| 3,901,552 | 8/1975 | Stone | 298/24 |
| 3,950,023 | 4/1976 | Mahoney | 296/183 |
| 4,009,792 | 3/1977 | Sano et al. | 414/499 X |
| 4,018,480 | 4/1977 | Stone | 298/27 |
| 4,051,968 | 10/1977 | Massey | 414/500 X |
| 4,092,051 | 5/1978 | D'Orazio | 298/24 |
| 4,127,300 | 11/1978 | Melley et al. | 296/182 |
| 4,155,469 | 5/1979 | Cole | 298/27 |
| 4,203,697 | 5/1980 | Cayton | 414/500 X |
| 4,221,427 | 9/1980 | Sentle, Jr. et al. | 296/181 |
| 4,231,695 | 11/1980 | Weston, Sr. | 414/498 |
| 4,318,658 | 3/1982 | McIntyre | 298/17 R X |
| 4,418,853 | 12/1983 | Shaffer | 296/37.1 X |
| 4,557,400 | 12/1985 | Clarke | 296/181 X |
| 4,642,007 | 2/1987 | Marshall et al. | 410/78 |
| 4,890,970 | 1/1990 | Willits | 414/500 X |

FOREIGN PATENT DOCUMENTS

| | | | |
|---|---|---|---|
| 414049 | 8/1910 | France | 414/494 |
| 82228 | 4/1988 | Japan | 414/500 |

Primary Examiner—David A. Bucci
Attorney, Agent, or Firm—Dowell & Dowell

[57] ABSTRACT

A dump truck or trailer has a side hinged rear door and longitudinal rails for wheeled pallets in order that it may be used, alternatively, for hauling comminuted or palletized cargo. A winch and cable system is provided to assist in movement of the palletized cargo on the rails. A storage rack for pallets is provided.

6 Claims, 2 Drawing Sheets

TRUCK FOR ALTERNATELY HANDLING BULK AND PALLETIZED CARGO

BACKGROUND OF THE INVENTION

1. Field of the Invention hauling by truck, of cargo of bulk or comminuted and palletized types.

2. Description of the Prior Art

Dump trucks or dumping trailers for hauling comminuted bulk cargo such as sand or aggregate are well known in the art. Similarly, non-dumping trucks and trailers into which palletized units of cargo may be loaded at one point and unloaded at a destination are known Since each type of vehicle has a specialized body, in situations in which a truck hauls cargo of one type to a destination having cargo to be hauled of the other type, the practice has been to return with the empty vehicle back to the loading point. Such deadhead or non-load transporting use has represented a substantial loss of the potential load carrying capacity of vehicles costing approximately $100,000, or more, in addition to the lost time of the operator.

In particular, vehicles for carrying comminuted or palletized cargo have been adapted to carry the load available at only one loading point, thus transporting in only one direction, and thereby losing potential economic value.

The U.S. Pat. Nos. to Sentle 4,221,427 and Clarke 4,557,400 disclose trailer bodies for hauling bulk comminuted material having a cargo area below the level of the floor, and for changing the construction of the floor in order that containerized cargo may be hauled in the other direction.

The U.S. Pat. Nos. to Gibson et al. 2,216,972, DeWitt 2,819,810, Mahoney 3,950,023, Sano et al. 4,009,792, Melley et al. 4,127,300, Weston 4,231,695 and Marshall 4,642,007 disclose trucks having bodies that are particularly designed to facilitate the loading, unloading and hauling of containerized cargo such as pallets, including the use of rails within the vehicle on which wheels on the pallets may ride. The DeWitt patent in particular discloses a system such as that described in which a conveyer chain is employed to assist in the movement of the pallets on the rails.

The U.S. Pat. Nos. to Thornton 1,451,127 and Weber 1,557,749 disclose trucks having bodies that may be placed in the dumping position and which carry dumping type containers.

The U.S. Pat. Nos. to Filipoff et al. 2,789,715, Phillips et al. 3,659,899 and Kreutzer 3,712,491, disclose vehicles in which the load carrying body may be elevated to dumping position, thus permitting transport of dumpable material or other cargo.

SUMMARY OF THE INVENTION

It is an object of the invention to provide in a dumping type truck or trailer the capability of carrying bulk comminuted material to one destination for unloading and then loading palletized cargo for transport to another destination, without the necessity for modifying the vehicle structure between the different loads.

A further object of an invention is to provide a dumping type truck or trailer with means for carrying palletized cargo, and for storing pallets during nonuse.

A still further object is to provide a method of converting a dump truck or trailer having a flat bed of a type designed especially for hauling comminuted bulk materials to a vehicle adapted for handling palletized cargo.

A still further object is to provide a vehicle for two-way hauling of either comminuted material or palletized cargo, in which means is provided for assisting in the movement of the palletized cargo on the vehicle bed, thus assisting in the loading and unloading of the palletized cargo onto and off of the vehicle.

BRIEF DESCRIPTION OF THE DRAWINGS

The foregoing and other objects of the invention will become apparent from the following description in conjunction with the accompanying drawings in which.

DESCRIPTION OF THE PREFERRED EMBODIMENT

Figure 1:
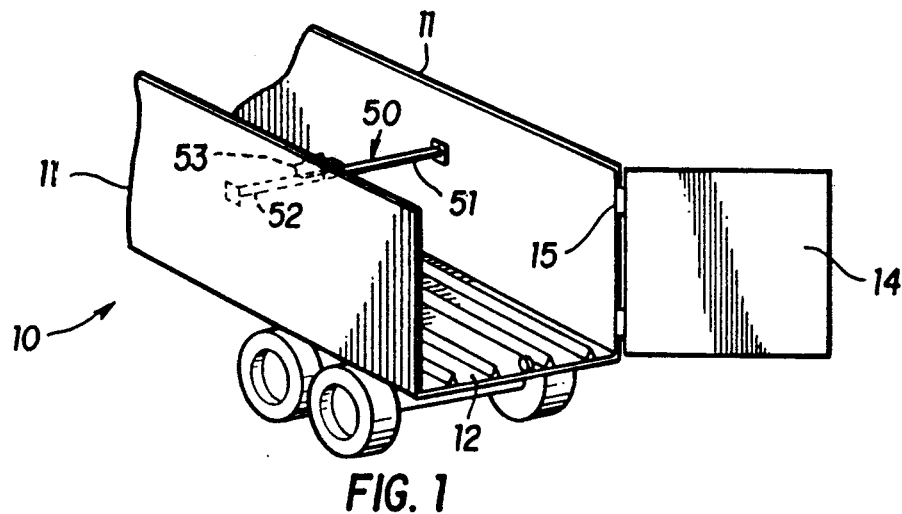
FIG. 1 is a fragmentary perspective of the rear portion of a dumping type trailer in accordance with the present invention.
Figure 2:
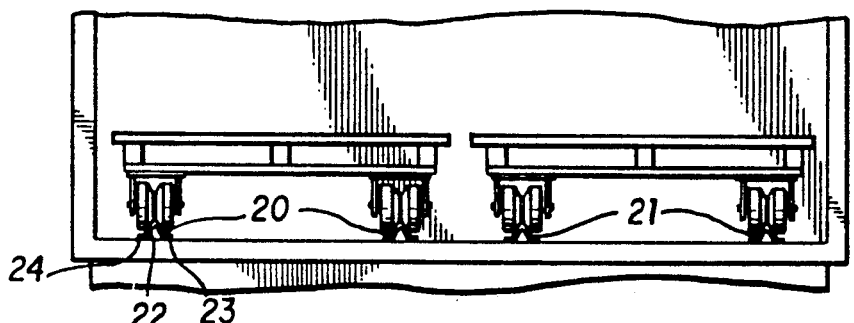
FIG. 2 is an end view to an enlarged scale of the trailer of FIG. 1 and illustrating pallets loaded therein in accordance with the present invention.
Figure 3:
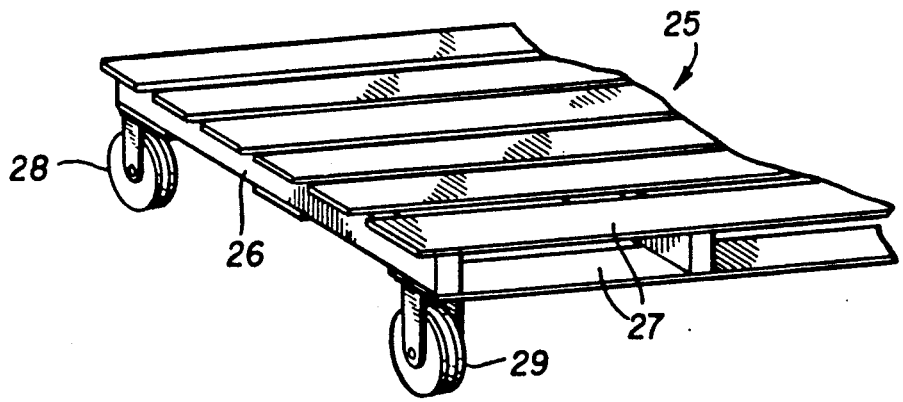
FIG. 3 is a perspective to an enlarged scale of a pallet in accordance with the present invention.
Figure 4:
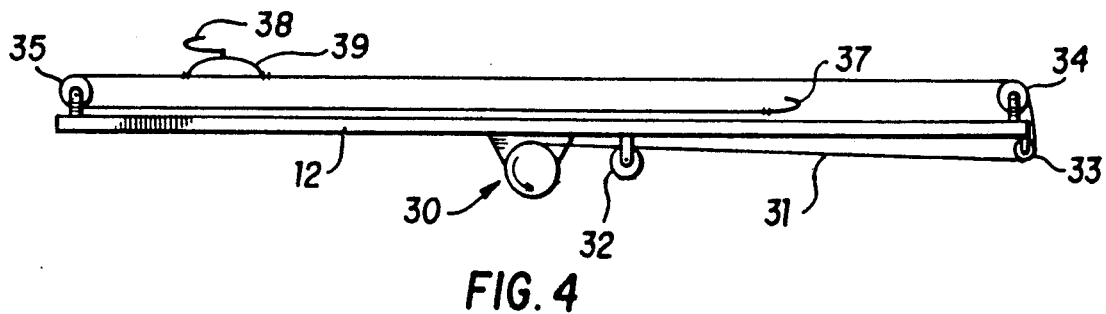
FIG. 4 is a diagramatic representation of a winch and cable system for assisting in moving the pallets, in accordance with the present invention, and as applied to a trailer body of the type illustrated in FIGS. 1, 2 and 5.

With further reference to the drawings a trailer 10 of the dumping type has sidewalls 11, a bed or floor 12 and front wall 13. In accordance with the present invention the trailer has a rear swinging door 14 that is mounted on hinges 15. The trailer is pulled by a tractor, not shown, which includes mechanism for elevating the front portion of the trailer in order to dump the cargo therein, such as aggregate or the like, with the door 14 in the open position In order that the trailer may haul loaded pallets, the generally flat and continuous floor 12 is provided with two pairs of spaced rails 20 and 21, extending from front to rear of the trailer. The rails may consist of steel angle members 22 having their outer edges 23 mounted by welds 24 on the trailer floor Pallets 25, having the usual longitudinal stringers 26 and cross members 27, are provided, each pallet being mounted on front and rear pairs of wheels 28, 29 which are spaced to engage a pair of rails 20 or 21. The pallets may either be loaded on the ground and then lifted on to the rails by a forklift or may be lifted on to the rails prior to loading, the truck bed being in normal, non-dumping, horizontal position In order to assist in the movement of the pallets on the rails a winch and cable system is provided, as more particularly shown in FIG. 4. With reference to FIG. 4, there is provided a winch 30 which is mounted on the underside of the bed 12 of the trailer. The winch is operable to rotate in a counterclockwise direction as indicated in FIG. 4 to draw a cable 31 onto it, over an idler roller 32, a grooved roller 33, a pulley 34 at the rear center of the vehicle, and a pulley 35 at the front center. At the free end of the cable, a hook 37 is provided for drawing pallets from the rear portion of the bed 12 toward the front. Rearwardly of the front pulley 35 and on the cable run between the pulleys, a second hook 38 is provided for pulling loaded pallets to the rear portion of the trailer bed. The hook 38 is preferably mounted on the cable by a rope 39 which facilitates its being grasped by an operator when the winch 30 is in the free-running mode in order to draw the cable from the winch and back onto the truck so that it may be arranged in the position of FIG. 4 for further use After the last pallet is loaded the bracing rod 50 having the members 51, 52 connected by a jackhandle 53 is positioned across the walls of the body in order to engage the rearmost pallets or the material loaded onto them and restrain their movement while the cargo is being transported As a further restraint, the hook 37 is engaged with one or both of the rearmost pallets and the winch 30 is left in an engaged position so that the cable may not be readily pulled off the winch.

Figure 5:
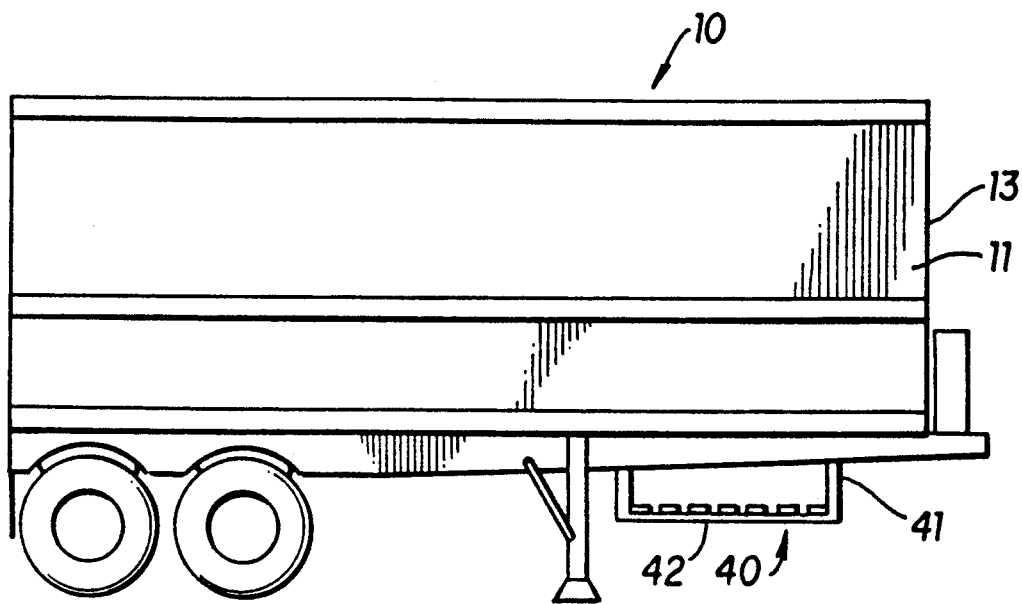
FIG. 5 is a side elevation of a trailer body having a rack structure for carrying pallets for later use.
Figure 6:
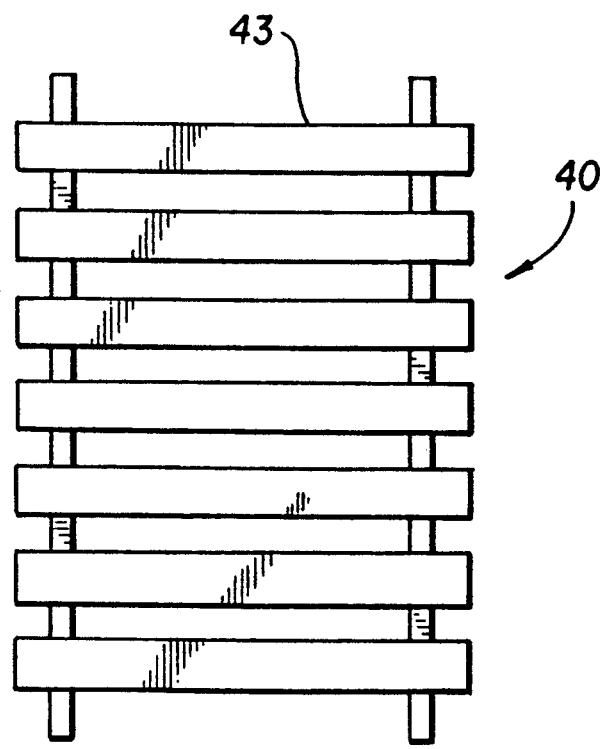
FIG. 6 is a layout to an enlarged scale of the rack structure of FIG. 5.

With reference to FIGS. 5 and 6, in order to facilitate the transport of the pallets when they are not in use for hauling cargo, a rack 40 is mounted on the underside of the trailer body and forwardly of the rear wheels. The rack includes depending support members 41, a main body 42 and cross members 43.

In the use of the device, assuming that the comminuted material is to be hauled initially, the body of the trailer is loaded, the rear door 14 being closed, and the pallets being outside of the truck body such as being mounted on the racks as indicated in FIGS. 5 and 6. The truck is then driven to the destination for the bulk material where the swinging door 14 is opened and the body raised into dumping position in order to discharge the comminuted cargo. The truck body is then returned to horizontal and moved to the location for loading of the palletized cargo. In such position, the swinging door 14 is opened and the pallets are placed on the rails. Hook 37 is then sequentially secured to the pallets with the cable system being activated to move each loaded pallet forwardly into the desired position on the rails. The pallets may be loaded with cargo either before or after being placed on the rails.

After the pallets are transported to their destination, they are unloaded from the body of the truck by using hook 38 and the cable system. Thereafter, the truck is ready to be reloaded with comminuted cargo material A conventional dumping trailer having a flat bed may be readily converted to a pallet hauling trailer in accordance with the present invention by providing a swinging hinge door at the rear, mounting rails within the body of the trailer as described and preferably providing a winch and cable system of the type described. In addition, racks for carrying pallets during the hauling of comminuted material are preferably provided as indicated in the drawings.

I claim:

1. A dumping type vehicle having a body that is movable from a horizontal to an inclined position, for loading and transporting comminuted material while in a horizontal position and dumping it while int he inclined position, or, alternatively, for loading, transporting, and unloading pallets while in the horizontal position, said vehicle having an open top, a generally flat bed portion and walls for holding comminuted material on the bed portion, said vehicle having a wall that may be opened to permit the dumping of comminuted material while in an inclined position, or, alternatively, to permit the loading and unloading of pallets while in a horizontal position, rail means mounted on the bed portion for receiving, transporting and unloading said pallets, and means mounted on the vehicle and having pallet engaging means for moving pallets along said rail means while the vehicle body is in a horizontal position.

2. The invention of claim 1, in which said vehicle has front and rear wheels, rack means for carrying pallets mounted beneath the vehicle's flat bed portion and between the front and rear wheels, said rack means having depending support members mounted forwardly of said rear wheels, and cross members carried by said support members.

3. The invention of claim 1, in which said rail means includes a pair of rails extending side-by-side longitudinally of the vehicle's body.

4. The invention of claim 1, and removable means interengaging said vehicle body an adapted to engage said pallets in order to restrain the pallets from movement during transport.

5. A two-way hauling system comprising a dumping type vehicle for hauling comminuted material, said vehicle having side and end walls and a generally flat floor portion, said end wall being mounted for opening and closing, rail means mounted on said floor portion for receiving pallets which are selectively mountable on said rail means, whereby comminuted cargo may be hauled in one direction of said vehicle and palletized cargo in the other, thereby avoiding dead time of said vehicle, and winch and cable means for moving said pallets along the floor portion of said vehicle, said winch being mounted beneath the floor portion of said vehicle and a pulley being provided at the front and rear end of said vehicle, a first pallet engaging means mounted at an end of the cable which, in one position of said cable, is adjacent to the rear pulley and is connected to a cable run from the front pulley, and a second pallet engaging means is mounted on said cable adjacent to said front pulley when said cable is in said one position, said second pallet engaging means being connected to a run of the cable between said front and rear pulleys.

6. The method of converting a dumping type vehicle having an open top, walls and a flat bed designed especially for loading and transporting comminuted bulk material while in a horizontal position and dumping it while in an inclined position, to an alternative use for loading, transporting and unloading palletized cargo while in a horizontal position, comprising mounting one or more pairs of rails on the flat bed, mounting a pallet engaging means on the vehicle for engaging and moving a pallet along the rails, and mounting a door that may be opened or closed in a wall of said trailer in a position t discharge comminuted bulk cargo while the bed is in an inclined position or to load or unload palletized cargo while the bed is in a horizontal position.

* * * * *